United States Patent
Park et al.

(10) Patent No.: US 8,780,288 B2
(45) Date of Patent: Jul. 15, 2014

(54) LIQUID CRYSTAL DISPLAY DEVICE

(75) Inventors: Kyung Jae Park, Paju-si (KR); Hak Mo Hwang, Goyang-si (KR); Sung Hwan Yoon, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 197 days.

(21) Appl. No.: 13/180,043

(22) Filed: Jul. 11, 2011

(65) Prior Publication Data

US 2012/0013818 A1 Jan. 19, 2012

(30) Foreign Application Priority Data

Jul. 14, 2010 (KR) .................. 10-2010-0067787

(51) Int. Cl.
*G02F 1/1333* (2006.01)

(52) U.S. Cl.
USPC ............................................ 349/58; 362/633

(58) Field of Classification Search
None
See application file for complete search history.

(56) References Cited

U.S. PATENT DOCUMENTS

| | | | | |
|---|---|---|---|---|
| 6,411,353 B1 * | 6/2002 | Yarita et al. | | 349/58 |
| 2007/0132905 A1 * | 6/2007 | Kim et al. | | 349/58 |
| 2007/0222917 A1 * | 9/2007 | Ono | | 349/58 |
| 2009/0091680 A1 * | 4/2009 | Jung et al. | | 349/58 |
| 2009/0153766 A1 * | 6/2009 | Lee et al. | | 349/58 |
| 2009/0316064 A1 * | 12/2009 | Kono et al. | | 349/58 |
| 2010/0253874 A1 * | 10/2010 | Ito et al. | | 349/58 |
| 2014/0043560 A1 * | 2/2014 | Jang et al. | | 349/58 |

FOREIGN PATENT DOCUMENTS

CN 1651994 A 8/2005

* cited by examiner

*Primary Examiner* — Bumsuk Won
*Assistant Examiner* — Ryan Crockett
(74) *Attorney, Agent, or Firm* — McKenna Long & Alridge LLP

(57) ABSTRACT

Disclosed is an LCD device including: a liquid crystal panel including an upper substrate and a lower substrate; a backlight unit supplying light to the liquid crystal panel; a guide frame guiding a location of the liquid crystal panel and a location of the backlight unit; and a rear set cover and front set cover accommodating the liquid crystal panel, the backlight unit, and the guide frame, and serving as a cover of a product, wherein the front set cover comprises an bezel part facing a side of the upper substrate, and being not formed on a top of the upper substrate.

7 Claims, 5 Drawing Sheets

LIQUID CRYSTAL DISPLAY DEVICE

CROSS REFERENCE TO RELATED APPLICATIONS

This application claims the benefit of the Korean Patent Application No. 10-2010-0067787 filed on Jul. 14, 2010, which is hereby incorporated by reference as if fully set forth herein.

BACKGROUND

1. Field of the Invention

The present invention relates to a Liquid Crystal Display (LCD) device, and more particularly, an LCD device with thin thickness and enhanced sense of beauty.

2. Discussion of the Related Art

LCD devices are being applied to various fields such as notebook computers, monitors, spacecrafts, and airplanes. In LCD devices, response time and image quality have largely been enhanced technically to date.

Recently, research and development are particularly being required on designs of products appealing to consumers. Consequently, efforts for minimizing the thicknesses of LCD devices are continuously being made, and research is being conducted on a design with enhanced sense of beauty that can induce consumers to buy by appealing to consumers' sense of beauty.

In efforts for minimizing the thicknesses of LCD devices and design development for enhancing a sense of beauty that have been made to date, however, the existing elements have been applied as is, the structures of the elements have been changed simply, and thus, there are limitations in minimizing the thicknesses of the LCD devices and developing new designs of the LCD devices.

In the related art LCD devices, a liquid crystal panel and a backlight unit are placed with an upper case and a lower case, thereby manufacturing a module. Furthermore, a separate lower cover and a separate upper cover are additionally used for manufacturing the module as a complete product such as a notebook computer, a monitor, or a television (TV).

In this way, since the related art LCD devices use a case for the manufacturing of a module and a cover for the manufacturing of a complete product, a thickness has inevitably been increased. Particularly, an upper cover is protrusion-molded at the edge of a LCD device in applying the cover for the manufacturing of the complete product, and thus, there are limitations in developing various designs with a sense of beauty.

SUMMARY

Accordingly, the present invention is directed to an LCD device which has a minimized thickness and an enhanced sense of beauty by not applying some of the existing elements.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided an LCD device including: a liquid crystal panel including an upper substrate and a lower substrate; a backlight unit supplying light to the liquid crystal panel; a guide frame guiding a location of the liquid crystal panel and a location of the backlight unit; and a rear set cover and front set cover accommodating the liquid crystal panel, the backlight unit, and the guide frame, and serving as a cover of a product, wherein the front set cover comprises an bezel part facing a side of the upper substrate, and being not formed on a top of the upper substrate.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Figure 1:
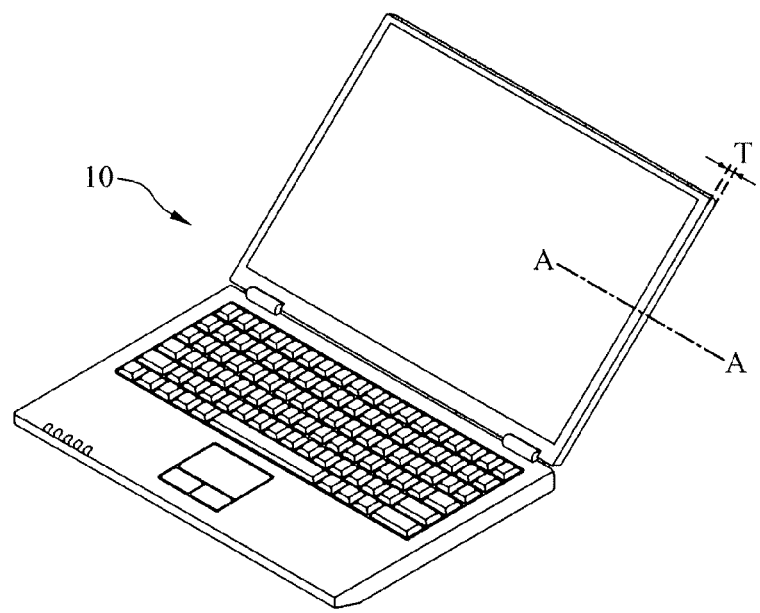
FIG. 1 is a perspective view of a notebook computer to which an LCD device according to the present invention may be applied.

FIG. 1 is a perspective view of a notebook computer 10 to which an LCD device according to the present invention may be applied. FIGS. 2, 3A to 3C, 4, and 5 are sectional views of respective LCD devices according to embodiments of the present invention, and illustrate a cross-sectional surface taken along line A-A of FIG. 1.

Figure 2:
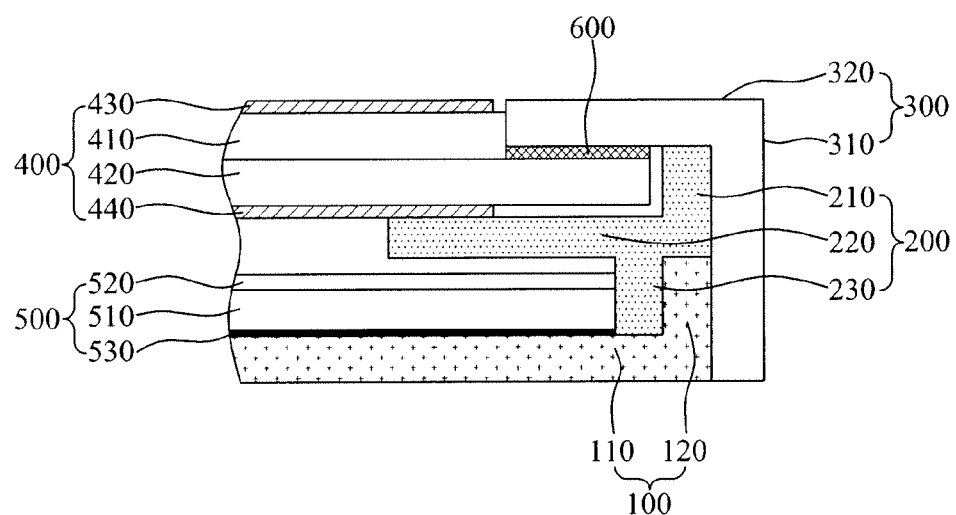
FIG. 2 is a sectional view of an LCD device according to a first embodiment of the present invention.

FIG. 2 is a sectional view schematically illustrating an LCD device according to a first embodiment of the present invention. As illustrated in FIG. 2, the LCD device according to the first embodiment of the present invention includes a rear set cover 100, a guide frame 200, a front set cover 300, a liquid crystal panel 400, a backlight unit 500, and a coupling member 600.

The rear set cover 100 and the front set cover 300 accommodate the guide frame 200, the liquid crystal panel 400, and the backlight unit 500, and serves as an external cover of a complete product such as a notebook computer. The guide frame 200 guides the location of the liquid crystal panel 400 and the location of the backlight unit 500. The liquid crystal panel 400 and the backlight unit 500 display an image. Hereinafter, the elements will be described in detail.

The rear set cover 100 supports the guide frame 200, serves as a rear cover of the complete product, and includes a plate part 110 and a bent part 120 extended from one end of the plate part 100. The plate part 110 supports all elements of the LCD device, and serves the rear cover of the complete product. The bent part 120 may allow the rear set cover 100 to be coupled to the guide frame 200 and the front set cover 300.

The guide frame 200 includes a first guide part 210, a support part 220, and a second guide part 230. The first guide part 210 and the support part 220 guide the location of the liquid crystal panel 400, and support the liquid crystal panel 400. The first guide part 210 faces a side of the liquid crystal panel 400, more specifically, a side of a lower substrate 420 of the liquid crystal panel 400 and guides the location of the liquid crystal panel 400. The support part 220 is extended from the first guide part 210 to support an edge of a bottom of the liquid crystal panel 400. The second guide part 230 is extended from the support part 220 to face a side of the backlight unit 500, and guides the location of the backlight unit 500.

The front set cover 300 includes a side wall part 310 and a bezel part 320 that is bent and extended from one end of the side wall part 310. The side wall part 310 serves as a side cover of the complete product such as a notebook computer, and the bezel part 320 serves as a front cover of the complete product.

The bezel part 320 is not disposed in a top of an upper substrate 410 of the liquid crystal panel 400 but is disposed to face a side of the upper substrate 410, and thus, the front set cover 300 does not further protrude than the liquid crystal panel 400, thereby decreasing the entire thickness of the LCD device. Also, the height of an upper end of the bezel part 320 is formed identically to that of the liquid crystal panel 400, and thus, the step coverage between the bezel part 320 and the display region displaying an image is removed. Accordingly, an aesthetic design effect can be obtained as if a front of the LCD device is seen as one structure.

The bezel part 320 faces the side of the upper substrate 410 of the liquid crystal panel 400 and is disposed on the top of the lower substrate 420 of the liquid crystal panel 400, and thus can prevent the separation of the liquid crystal panel 400 and easily serve as a front cover of the complete product. Particularly, the coupling member 600 is formed between the bezel part 320 and the lower substrate 420 of the liquid crystal panel 400, and thus the front set cover 300 can easily be coupled to the liquid crystal panel 400.

Although not shown, a separate coupling member may be formed between the first guide part 210 of the guide frame 200 and the side wall part 310 of the front set cover 300, and thus the guide frame 200 and the front set cover 300 can be coupled. Also, a separate coupling member may be formed between the second guide part 230 of the guide frame 200 and the bent part 120 of the rear set cover 100, and thus the guide frame 200 and the rear set cover 100 can be coupled. Moreover, a separate coupling member may be formed between the bent part 120 of the rear set cover 100 and the side wall part 310 of the front set cover 300, and thus the rear set cover 100 and the front set cover 300 can be coupled.

The liquid crystal panel 400 is disposed over the backlight unit 500 to display an image. The location of the liquid crystal panel 400 is guided by the first guide part 210 of the guide frame 200, and the liquid crystal panel 400 is supported by the support part 220 of the guide frame 200.

The liquid crystal panel 400 includes the upper substrate 410, the lower substrate 420, an upper polarizer 430, and a lower polarizer 440. A liquid crystal is formed between the upper substrate 410 and the lower substrate 420. A detailed structure of the upper substrate 410 and a detailed structure of the lower substrate 420 may be modified and formed in various types known in the art according to a driving mode of the liquid crystal panel 400, for example, a Twisted Nematic (TN) mode, a Vertical Alignment (VA) mode, an In Plane Switching (IPS) mode, and a Fringe Field Switching (FFS) mode.

Since various lines are formed on the lower substrate 420 and are required to be connected to an external driver, and thus, as illustrated, the length of the lower substrate 420 is formed greater than that of the upper substrate 410, and thus, a periphery region of the liquid crystal panel 400 is formed to be stepped. Accordingly, the bezel part 320 of the front set cover 300 is disposed in the stepped periphery region of the liquid crystal panel 400, more specifically, the bezel part 320 is disposed on the top of the lower substrate 420 to face the side of the upper substrate 410, and thus, an LCD device with thin thickness and enhanced sense of beauty can be obtained.

The upper polarizer 430 is attached to the top of the upper substrate 410, and the lower polarizer 440 is attached to the bottom of the lower substrate 420. Therefore, light transmittance is controlled by the combination of the upper polarizer 430 and the lower polarizer 440, thereby realizing black color or white color.

The backlight unit 500 is disposed under the liquid crystal panel 400 to supply light to the liquid crystal panel 400. The location of the backlight unit 500 may be guided by the second guide part 230 of the guide frame 200, and the backlight unit 500 may be supported by the plate part 100 of the rear set cover 100.

The backlight unit 500 may be categorized into a direct type backlight unit where a light source is disposed over under the liquid crystal panel 400 and light emitted from the light source is directly transferred to the liquid crystal panel 400, and an edge type backlight unit where a light source is disposed in one side under the liquid crystal panel 400 and light emitted from the light source is transferred to the liquid crystal panel 400 though a light guide plate. The present invention may apply the direct type backlight unit or the edge type backlight unit. To minimize the thickness of the LCD device, however, the edge type is better than the direct type, and thus, the edge type backlight unit 500 is illustrated in the accompanying drawings.

The backlight unit 500 includes a light guide plate 510, a plurality of optical sheets 520, and a reflective sheet 530. Although not shown, a light source such as a Light Emitting Diode (LED) or a fluorescent lamp is disposed to face a side of the light guide plate 510. Light emitted from the light source is incident on the light guide plate 510, and then, a path of the light is switched to the liquid crystal panel 400. To switch the light path, various patterns may be formed in the light guide plate 510. The optical sheets 520 are formed over the top of the light guide plate 510 and supply conformal light to the liquid crystal panel 400, and may be formed by combining a diffusion sheet and a prism sheet. The reflective sheet 530 is formed under the bottom of the light guide plate 510 and reflects light, leaked to the bottom of the light guide plate 510, to a top of the light guide plate 510, thereby increasing light efficiency.

The coupling member 600, as described above, couples the front set cover 300 and the liquid crystal panel 400, and specifically, is formed between the bezel part 320 of the front set cover 300 and the lower substrate 420 of the liquid crystal panel 400. The coupling member 600 may be a double side tape or an adhesive. A heat hardening adhesive, an ultraviolet (UV) hardening adhesive and an instant adhesive may be applied as the adhesive.

Figure 3A:
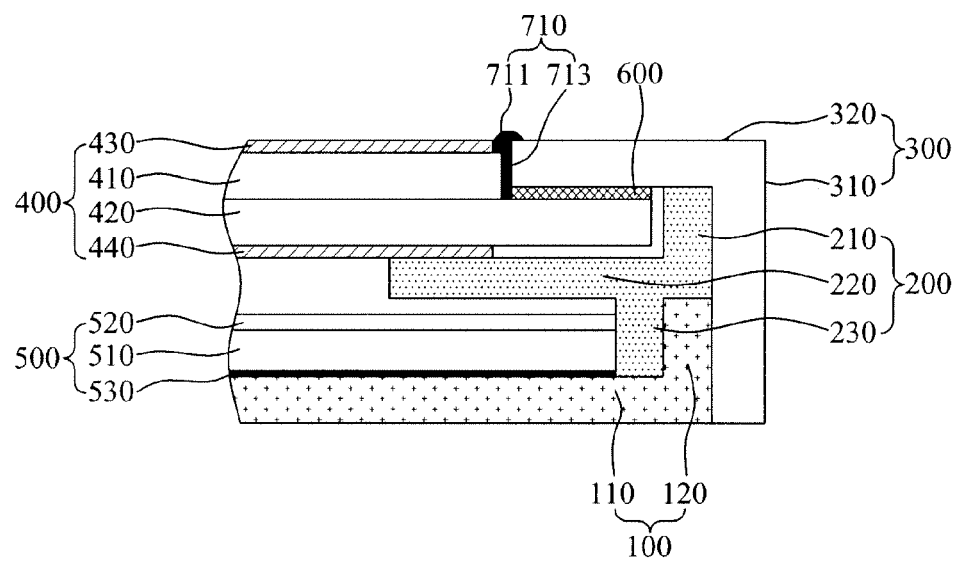
FIG. 3A is a sectional view of an LCD device according to a second embodiment of the present invention.
Figure 3B:
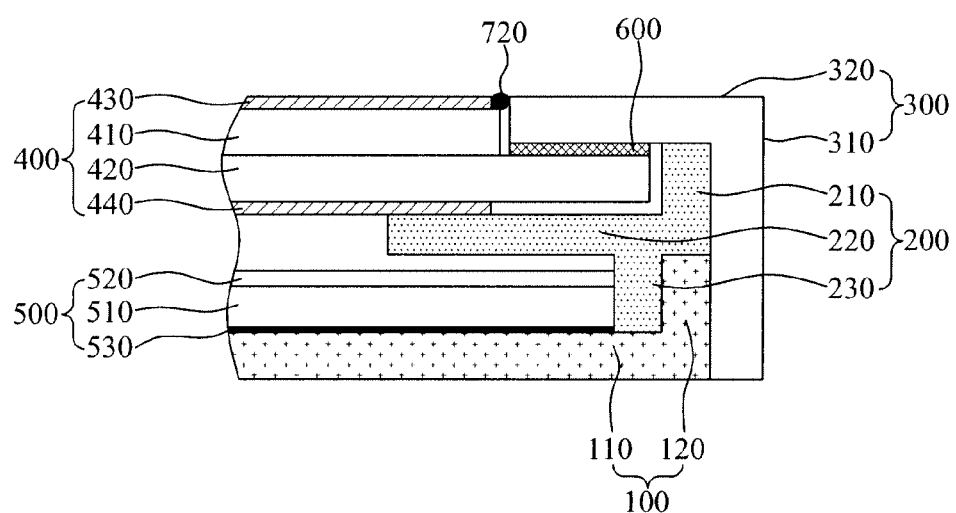
FIG. 3B is a sectional view of an LCD device according to a third embodiment of the present invention.
Figure 3C:
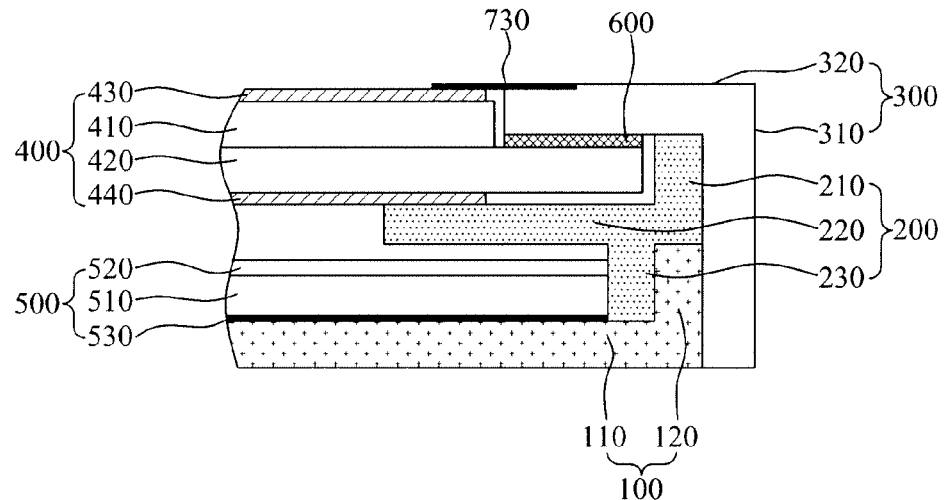
FIG. 3C is a sectional view of an LCD device according to a fourth embodiment of the present invention.

FIG. 3A is a sectional view of an LCD device according to a second embodiment of the present invention. FIG. 3B is a sectional view of an LCD device according to a third embodiment of the present invention. FIG. 3C is a sectional view of an LCD device according to a fourth embodiment of the present invention. The respective LCD devices according to the second to fourth embodiments of the present invention are the same as the LCD device according to the first embodiment of the present invention, except that a plurality of sealing members 710, 720 and 730 are additionally formed between the bezel part 320 of the front set cover 300 and the upper substrate 410 of the liquid crystal panel 400. Therefore, like reference numeral refers to like element throughout, and repetitive description on the same element will not be provided.

Considering the occurrence of a process error, a gap may be formed between the bezel part 320 of the front set cover 300 and the upper substrate 410 of the liquid crystal panel 400. In this way, if the gap is formed, foreign substances may be penetrated through the gap, and also, the aesthetic design effect of the LCD device is reduced due to the gap. In the second to fourth embodiments of the present invention, therefore, the first to third sealing members 710, 720 and 730 are additionally formed between the bezel part 320 of the front set cover 300 and the upper substrate 410 of the liquid crystal panel 400, thereby preventing the foreign substances from penetrating through gap and preventing an aesthetic design effect from being reduced due to the gap. To prevent the aesthetic design effect from being reduced, the first to third sealing members 710, 720 and 730 may be formed in the same color as that of the front set cover 300.

As illustrated in FIG. 3A, the first sealing member 710 may include a head part 711 extended from on the bezel part 320 to on the upper substrate 410, and a head supporter 713 extended from the head part 711 to inside the gap. By applying the first sealing member 710 including the head part 711 and the head supporter 713, a sealing effect can be obtained, and moreover, a coupling strength between the front set cover 300 and the liquid crystal panel 400 can be increased.

As illustrated in FIG. 3B, the second sealing member 720 may have a ring structure that seals the gap between the bezel part 320 of the front set cover 300 and the upper substrate 410 of the liquid crystal panel 400.

As illustrated in FIG. 3C, the third sealing member 730 may have a film structure that is formed from the top of the liquid crystal panel 400 to on the bezel part 320 of the front set cover 300. By applying the third sealing member 730 including the film structure, a sealing effect can be obtained, and moreover, the coupling strength between the front set cover 300 and the liquid crystal panel 400 can be increased. In the meanwhile, if the film structure is extended to an end of the bezel part 320, it is possible for the film structure to easily be peeled. Thus, it is preferable that the film structure may not be extended to the end of the bezel part 320. And, by forming an accommodation groove for accommodating the film structure in the bezel part 320, the peeling possibility of the film structure can be minimized.

Figure 4:
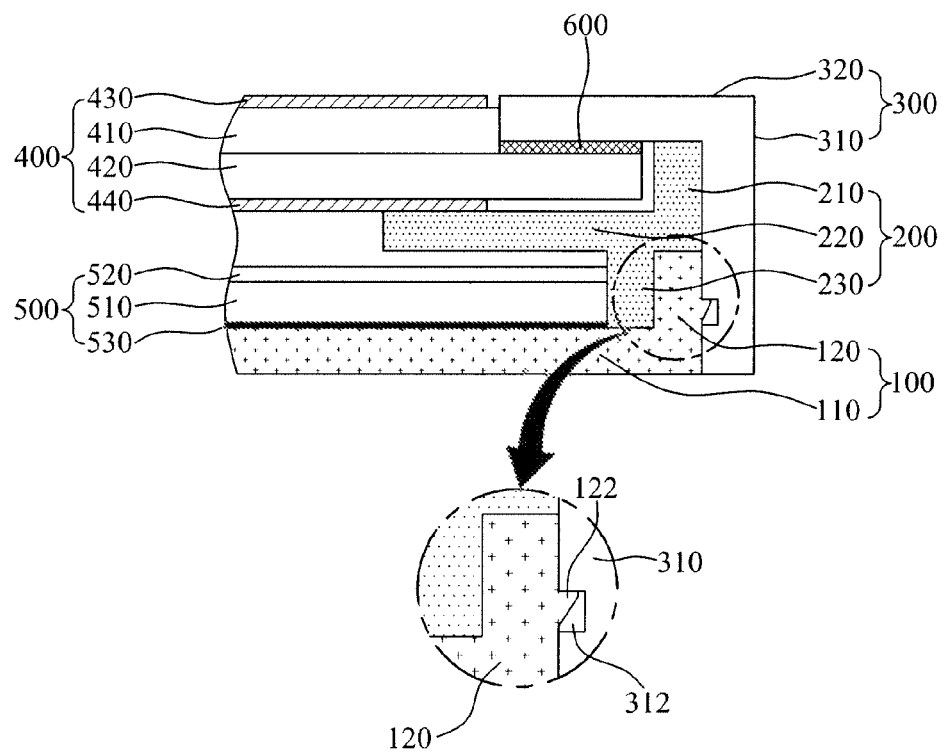
FIG. 4 is a sectional view of an LCD device according to a fifth embodiment of the present invention.

FIG. 4 is a sectional view of an LCD device according to a fifth embodiment of the present invention. The LCD devices according to the fifth embodiment of the present invention is the same as the LCD device according to the first embodiment of the present invention, except for a scheme that couples the rear set cover 100 and the front set cover 300. Therefore, like reference numeral refers to like element throughout, and repetitive description on the same element will not be provided.

As described above, the rear set cover 100 and the front set cover 300 may be coupled with a double side tape, but in which case a process is complicated and the material cost is increased. In the fifth embodiment of the present invention, therefore, a protrusion 122 is formed in the rear set cover 100, specifically, the bent part 120 of the rear set cover 100, and a coupling groove 312 is formed in the front set cover 300, specifically, the side wall part 310 of the front set cover 300, thereby coupling the rear set cover 100 and the front set cover 300 without using a separate adhesive such as the double side tape. The protrusion 122 and the coupling groove 312 may be variously modified.

Although not shown, a coupling groove may be formed in the rear set cover 100, and a protrusion may be formed in the front set cover 300. Also, although not shown, the rear set cover 100 and the guide frame 200 may be coupled with the protrusion and the coupling groove, or the guide frame 200 and the front set cover 300 may be coupled with the protrusion and the coupling groove.

Figure 5:
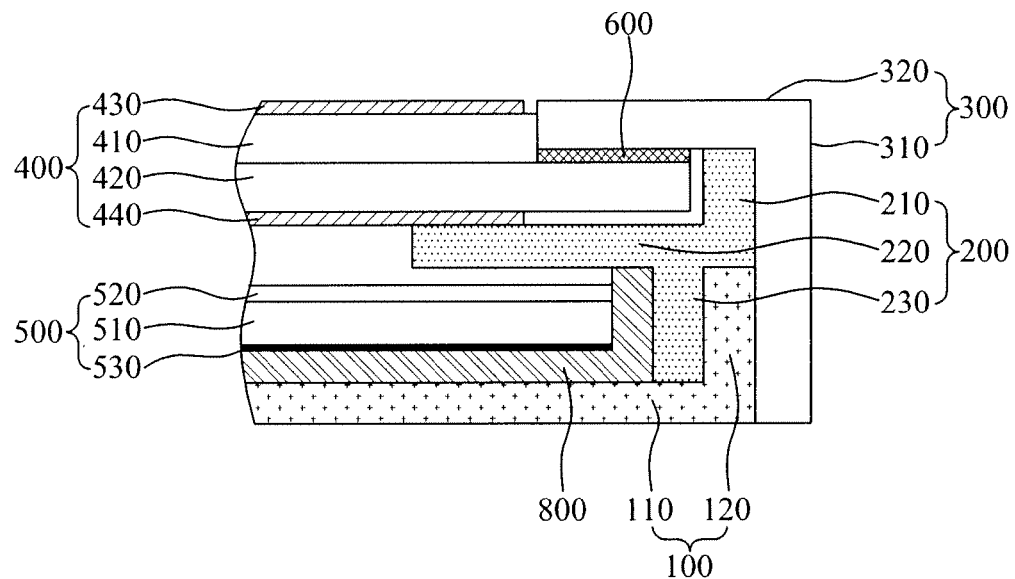
FIG. 5 is a sectional view of an LCD device according to a sixth embodiment of the present invention.

FIG. 5 is a sectional view of an LCD device according to a sixth embodiment of the present invention. The sixth embodiment of the present invention is implemented by adding a cover bottom 800 to the first embodiment of the present invention.

The cover bottom 800 is disposed between the backlight unit 500 and the rear set cover 100, supports a bottom of the backlight unit 500, and faces a side of the backlight unit 500. The cover bottom 800 may dissipate heat produced by the backlight unit 500. That is, when the size of the LCD device is increased, heat produced by the backlight unit 500 may be increased, in which case a heat dissipation device is required for dissipating the heat produced by the backlight unit 500. Therefore, when the cover bottom 800 is formed with a metal material enabling thermal conduction, the heat produced by the backlight unit 500 may be transferred through the cover bottom 800 and thus dissipated to the outside. As a result, when applying the cover bottom 800, a material of the rear set cover 100 may be selected with no consideration of thermal conductivity, and the external appearance of the LCD device may be various modified.

Although not shown, the coupling relationship using the first to third sealing members 710, 720 and 730 of respective FIGS. 3A to 3C and the protrusion 122 and coupling groove 312 of FIG. 4 may be identically applied even to the LCD device of FIG. 5.

Figure 6:
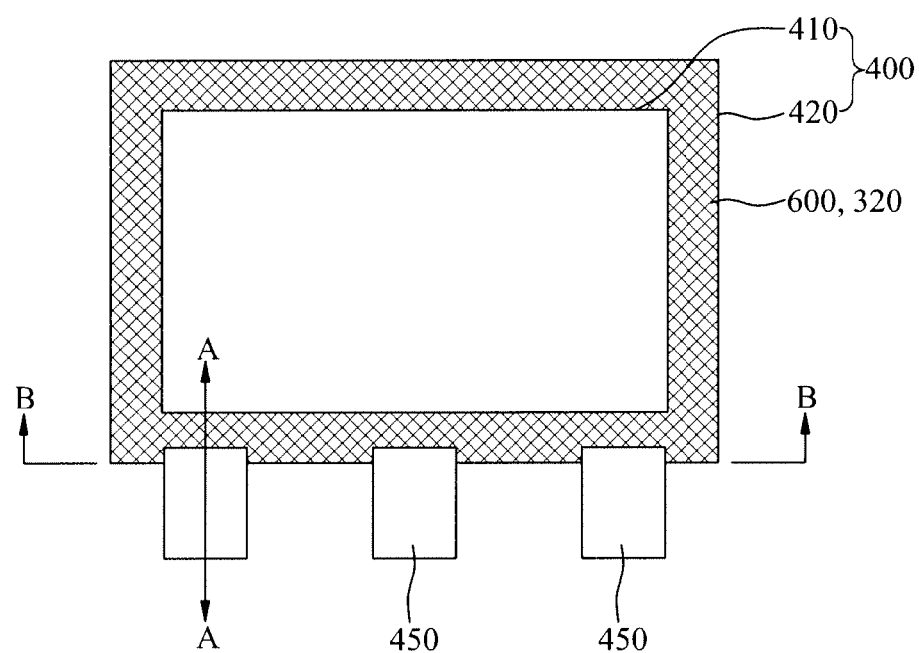
FIG. 6 is a plan view of an LCD device according to the present invention where a Flexible Printed Circuit (FPC) is formed.
Figure 7A:
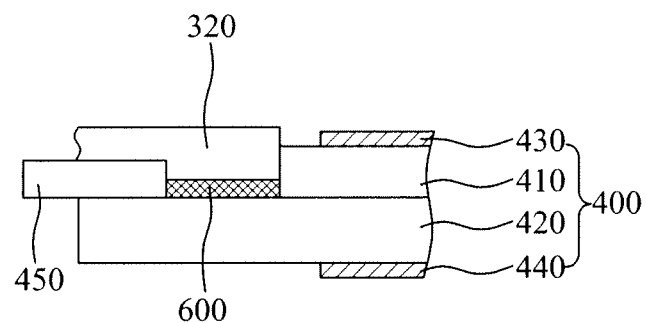
FIG. 7A is a sectional view taken along line A-A of FIG. 6.
Figure 7B:
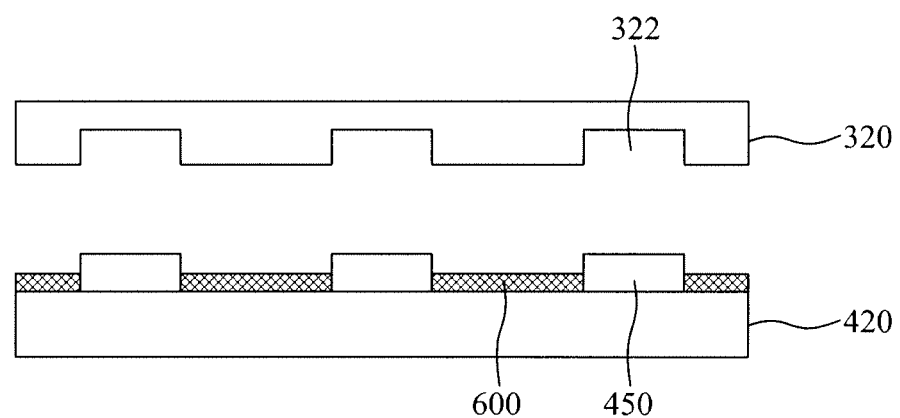
FIG. 7B is a disassembly sectional view corresponding to a line B-B of FIG. 6.

FIG. 6 is a plan view schematically illustrating a coupling type between a lower substrate of a liquid crystal panel and a bezel part of a front set cover, in an LCD device according to the present invention where a Flexible Printed Circuit (FPC) is formed. FIG. 7A is a sectional view taken along line A-A of FIG. 6. FIG. 7B is a disassembly sectional view corresponding to a line B-B of FIG. 6.

As illustrated in FIG. 6, in the liquid crystal panel 400, the length of the lower substrate 420 is formed greater than that of the upper substrate 410, and thus, the periphery region of the lower substrate 420 is exposed to the outside. In this way, a circuit board such as an FPC 450 is formed in a portion of the periphery region of the exposed lower substrate 420, and thus, various signals may be respectively applied from an external driver to the lines of the lower substrate 420 through the FPC 450.

The coupling member 600 such as a double side tape and the bezel part 320 of the front set cover 300 are sequentially formed in the periphery region of the exposed lower substrate 420. In the case that the coupling member 600 and the bezel part 320 of the front set cover 300 are formed even in a region where the FPC 450 is formed, load may be applied to the FPC 450. Therefore, it is required to differently form the coupling member 600 and the bezel part 320 of the front set cover 300, in the region where the FPC 450 is formed. This will be described below with reference to FIGS. 7A and 7B.

As illustrated in FIGS. 7A and 7B, the coupling member 600 is formed on the lower substrate 420, but not formed in the region where the FPC 450 is formed.

Moreover, as illustrated in FIG. 7B, the accommodation groove 322 for accommodating the FPC 450 is formed in the bezel part 320 corresponding to the region where the FPC 450 is formed, thereby preventing load from being applied to the FPC 450 due to the bezel part 320.

The present invention removes the existing upper case that was used for modularization, and thus can decrease the thickness of the LCD device. Particularly, according to the present invention, the bezel of the front set cover is not formed on the top of the upper substrate of the liquid crystal panel but formed on the top of the lower substrate of the liquid crystal panel and faces the side of the upper substrate, thereby minimizing the entire thickness of the LCD device.

Moreover, the present invention forms the bezel of the front set cover to have the same height of upper end as that of the liquid crystal panel, and thus removes the step coverage between the bezel and the display region displaying an image. Accordingly, an aesthetic design effect can be obtained as if the front of the LCD device is seen as one structure.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A Liquid Crystal Display (LCD) device comprising:
a liquid crystal panel comprising an upper substrate and a lower substrate;
a backlight unit supplying light to the liquid crystal panel;
a guide frame guiding a location of the liquid crystal panel and a location of the backlight unit; and
a rear set cover and a front set cover accommodating the liquid crystal panel, the backlight unit and the guide frame, and serving as a cover of a product,
wherein the front set cover comprises a side wall part, and a bezel part facing a side of the upper substrate and extended from the side wall part, the front set cover being not formed on a top of the upper substrate,
wherein the bezel part of the front set cover is disposed on the lower substrate of the liquid crystal panel,
wherein a circuit board connected to an external driver is formed on the lower substrate of the liquid crystal panel, and the bezel part of the front set cover comprises an accommodation groove for accommodating the circuit board, wherein the accommodation groove is formed in a lower surface of the bezel part,
wherein the guide frame includes a support part to support an edge of a bottom of the liquid crystal panel, and first and second guide parts respectively extending from the support part, wherein the first guide part faces a side of the lower substrate and has a height lower than the upper substrate, and the second guide part faces a side of the backlight unit, and
wherein a coupling member is formed on the lower substrate of the liquid crystal panel, the coupling member coupling the bezel part of the front set cover and the liquid crystal panel directly between a top surface of the lower substrate and a lower surface of the bezel part.

2. The LCD device according to claim 1, wherein the coupling member is a double side tape, a heat hardening adhesive, an ultraviolet (UV) hardening adhesive, or an instant adhesive.

3. The LCD device according to claim 1, wherein, the coupling member is not formed in a region of the circuit board.

4. The LCD device according to claim 1, wherein a height of an upper end of the front set cover is the same as a height of an upper end of the liquid crystal panel.

5. The LCD device according to claim 1, wherein a sealing member is additionally formed between the bezel part of the front set cover and the upper substrate of the liquid crystal panel.

6. The LCD device according to claim 1, wherein, a coupling system of a protrusion and a coupling groove is applied to at least one of between the guide frame and the front set cover, between the guide frame and the rear set cover, between the front set cover and the rear set cover.

7. The LCD device according to claim 1, wherein a cover bottom is additionally formed between the backlight unit and the rear set cover.

* * * * *